Figure 1:
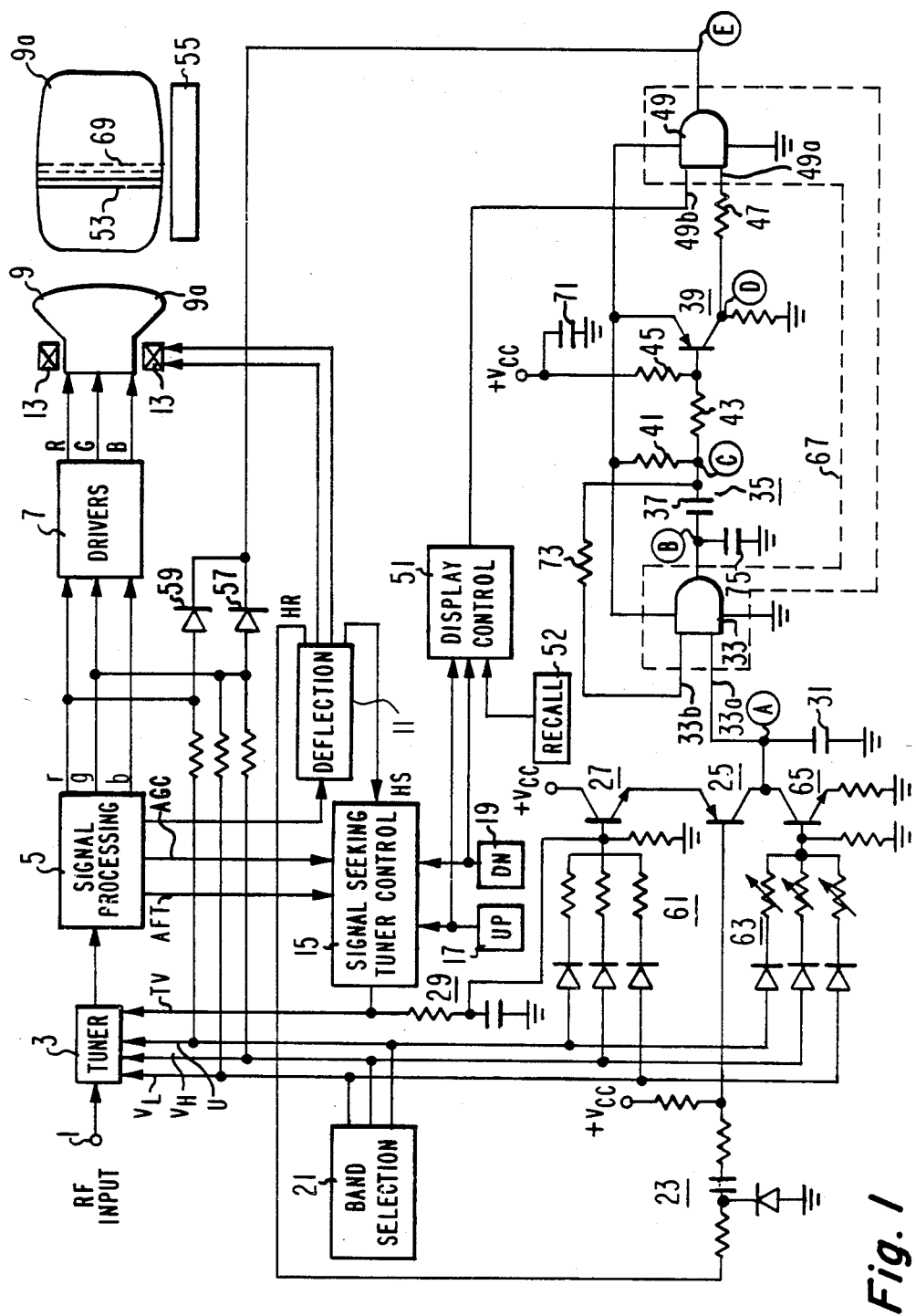

United States Patent [19]

Yu

[11] Patent Number: 4,598,317

[45] Date of Patent: Jul. 1, 1986

[54] RAMP COMPARATOR ARRANGEMENT USEFUL IN AN ON-SCREEN CHANNEL INDICATOR SYSTEM OF A TELEVISION RECEIVER

[75] Inventor: Ju M. Yu, Taoyuan, Taiwan

[73] Assignee: RCA Corporation, Princeton, N.J.

[21] Appl. No.: 573,227

[22] Filed: Jan. 23, 1984

[51] Int. Cl.[4] .............................................. H04N 5/50
[52] U.S. Cl. .............................. 358/192.1; 358/191.1; 358/193.1; 307/362
[58] Field of Search ............... 358/191.1, 192.1, 193.1; 307/362

[56] References Cited

U.S. PATENT DOCUMENTS 4,204,173  5/1980  Aschwanden ........................ 331/1
4,366,502  12/1982  Shiu ................................. 358/192.1

OTHER PUBLICATIONS

Pages 405–408 of the book "Pulse, Digital, and Switching Waveforms, Devices, and Circuits for their Generation and Processing" by J. Millman and H. T. Taub, published by McGraw-Hill Book Company, 1965.
A portion of the schematic for Hitachi CK-200.

Primary Examiner—James J. Groody
Assistant Examiner—E. Anne Toth
Attorney, Agent, or Firm—Eugene M. Whitacre; Paul J. Rasmussen; Peter M. Emanuel

[57] ABSTRACT

A television receiver includes a tuner responsive to a tuning voltage generated by a signal seeking tuning control unit and a channel indicator for displaying a vertical bar on the screen of the picture tube. The horizontal position of the bar is determined by the magnitude of the tuning voltage. The channel indicator includes a ramp signal generator for generating a composite ramp signal including a horizontal deflection rate ramp signal superimposed on the tuning voltage, a first AND function gate acting as a comparator to generate a first transition when the amplitude of the composite ramp signal traverses a switching threshold, a differentiator for determining the width of the bar having an input coupled to the output of the first AND function gate and an output coupled to a second AND gate which selectively couples the output signal of the differentiator to the picture tube when it is desired to display the bar. The two AND function gates are included in the same integrated circuit and, therefore, the output signal of the second AND function gate may be coupled to the first AND function gate to cause it to falsely switch thereby producing a disconcerting second bar on the screen. To overcome this problem, a feedback network is coupled between the output of the differentiator and a second input of the first AND gate to disable it from generating a second transition for a predetermined time after the first transition.

6 Claims, 2 Drawing Figures

RAMP COMPARATOR ARRANGEMENT USEFUL IN AN ON-SCREEN CHANNEL INDICATOR SYSTEM OF A TELEVISION RECEIVER

The present invention concerns a comparator for generating a pulse when the magnitude of the ramp type signal traverses a switching threshold, and particularly to such a comparator which is useful in an on-screen channel indicator of a television receiver.

One type of tuning control system for a television receiver includes apparatus for causing the tuner to sweep through a band of frequencies and apparatus for detecting when a received RF signal corresponds to an active channel. Such so-called signal seeking tuning control systems are desirable in that they are relatively inexpensive compared with other types of tuning control system such as those employing phase frequency locked loops or voltage synthesizers. However, one drawback of such signal seeking tuner control system is that since the active channels are not known in advance, the tuning process does not start with the selection of a specific channel and, as a result, an indication of which channel has been located must be indirectly derived.

In one type of channel indicator for a signal seeking tuner, a vertical bar is formed on the screen of a television receiver with its horizontal position determined by the magnitude of the tuning voltage. A user can determine the channel that has been tuned by the relationship of the vertical bar to channel numbers formed below the screen.

A typical bar-type channel indicator system is described in U.S. Pat. No. 4,366,502 (Shiu). In that system, a horizontal rate ramp is derived from horizontal rate pulses processed in the deflection system of the receiver. The ramp is combined with the tuning voltage and the resulting composite ramp signal is applied to a comparator. When the amplitude of the composite ramp signal traverses the threshold of the comparator in a predetermined sense, a pulse is generated and applied to the drivers of the picture tube of the television receiver to form a vertical bar. Thus, the magnitude of the tuning voltage determines when the pulse is generated and, thereby, the position of the vertical bar on the screen. Usually, a differentiator follows the comparator to determine the width of the pulse and therefore the width of the vertical bar.

It is common in commercially available television receivers employing a signal seeking tuner with a bar-type channel indicator system to employ, for the sake of economy, a number of logic elements, such AND or OR function gates, contained within the same integrated circuit package to perform various functions. For example one of the logic gates can be used as the comparator for the horizontal rate ramp signal and another can be used to enable the bar pulse to be coupled to the picture tube when it is desired to display the bar.

It has been recognized by the present inventor that when the logic elements employed in the channel indicator system are contained in the same integrated circuit package, a signal transition generated by a logic gate following the logic gate used for the ramp comparison in response to the ramp signal traversing the threshold of the comparison element may cause an unwanted second pulse to be generated at the output of the comparison gate. The resulting second pulse can produce a disconcerting and confusing second vertical bar on the screen of the picture tube.

In accordance with an aspect of the present invention, in a bar-type channel indicator system including a first logic gate such as an AND or NAND gate serving as a comparator for comparing the amplitude of a ramp with a predetermined threshold, a pulse width determining element such as a differentiator following the first logic gate, and a second logic gate, contained in the same integrated circuit package as the first logic gate, following the pulse width determining element, a feedback path is coupled between the pulse width determining element and the first logic gate for inhibiting it to produce a second transition for a predetermined time after a first transition is produced when the magnitude of the ramp signal traverses the predetermined threshold of the first logic gate.

Figure 2:
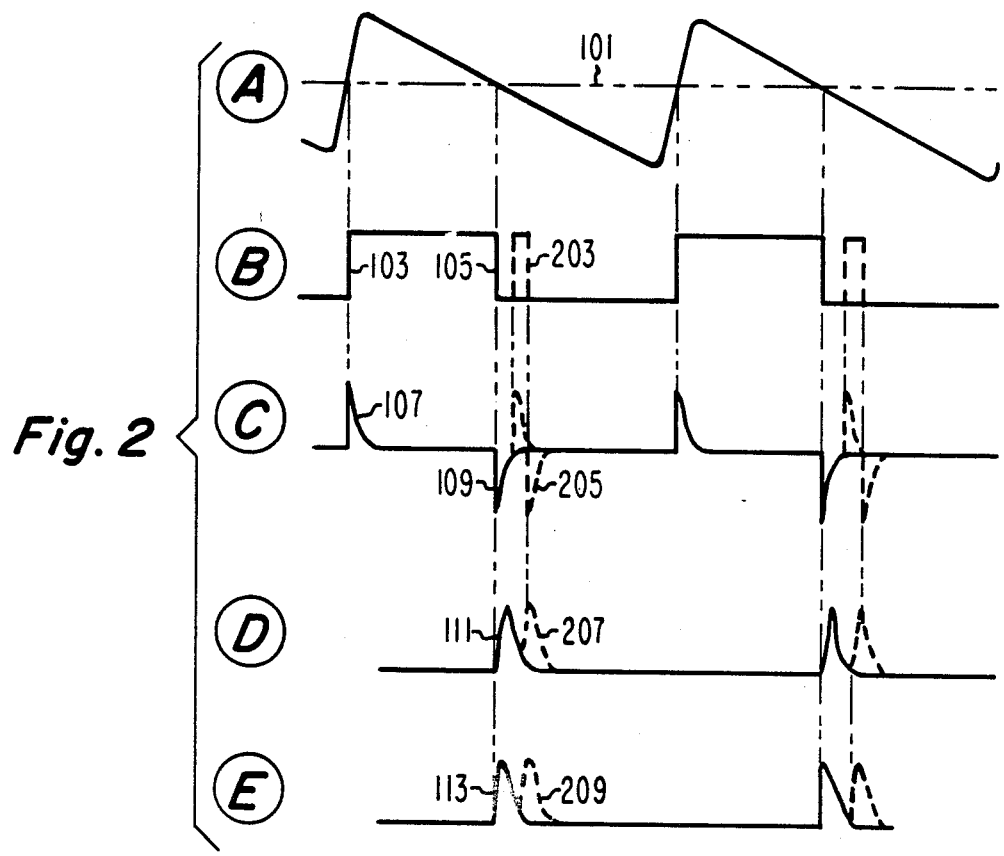

These and other aspects of the present invention are described with reference to the accompanying Drawing in which:

FIG. 1 is a schematic of a signal seeking tuning system with a bar-type signal indicator incorporating the preferred embodiment of the present invention; and FIG. 2 shows graphical representation of signal waveforms identified by letters corresponding to circuit points of the arrangement shown in FIG. 1 which are useful in understanding the operation of the preferred embodiment shown in FIG. 1.

In the tuning system of FIG. 1, RF signals received at an RF input 1 are coupled to a tuner 3. Tuner 3 is responsive to a tuning voltage (TV) for selecting and heterodyning the RF signals corresponding to various channels which may be received to derive an IF signal. The IF signal is coupled to a television signal processing unit 5 which demodulates the IF signal to produce a baseband composite television signal and which processes luminance and chrominance signal components of the baseband signal to produce low level red, green and blue (r,g,b) color signals. The low level color signals are applied to a driver 7 which amplifies these signals to produce red, green and blue (R,G,B) color drive signals. The drive signals are coupled to respective electron guns of a picture tube 9 for generating corresponding electron beams. A deflection unit 11 is responsive to the composite synchronization signal component of the composite baseband television signal to derive horizontal and vertical deflection signals which are coupled to deflection coils 13 for deflecting the electron beams produced by picture tube 9 in a conventional television raster scanning pattern in order to form an image on screen 9a of picture tube 9.

Tuner 3 is controlled by a signal seeking tuner control unit 15 which generates tuning voltage (TV) and increases or decreases its magnitude in ramp-like fashion to correspondingly change the tuning of tuner 3 until an active channel has been located. The direction of tuning during the signal seeking operation is determined by a user's depression of "up" and "down" push button switches 17 and 19. For locating active channels, signal seeking tuner control unit 15 is responsive to an automatic fine tuning (AFT) signal representative of the deviation of the frequency of picture carrier of the IF signal from its nominal value, e.g., 45.75 Hz in the United States and an automatic gain control (AGC) signal representative of the magnitude of the received signal. The AFT and AGC signals are both generated by signal processing unit 5 in conventional fashion. For locating active channels, tuner control unit 15 is also responsive to horizontal synchronization pulses (HS) generated by deflection unit 11. When all of the AFT, AGC and HS signals coupled to tuner control unit 15 are indicative of an active channel, tuner control unit 15 stops changing the magnitude of the tuning voltage and holds it substantially constant.

Since, typically, a voltage controlled tuner having various tuned circuits with only a single configuration of tuning inductors is incapable of being tuned throughout the television range including a plurality of bands, a user operated selection unit 21 generates band switching signals for controlling the tuning configuration of the various tuned circuits of tuner 3. By way of example, for receivers to be used in the United States, band selection unit 21 generates a $V_L$ band switching signal for channels 2 through 6 in a low VHF band, a $V_H$ band switching signal for channels 7 through 13 in a high VHF band and a U band switching signal for channels 14 through 83 in a UHF band.

The remaining portion of the television receiver shown in FIG. 1 is concerned with a bar-type channel indicator to which the present invention is specifically directed. In order to display the bar, negative-going horizontal retrace pulses (HR) are coupled by way of a negative peak-limiting or clipping and AC coupling network 23 from deflection unit 11 to the base of a PNP transistor 25. The emitter of transistor 25 is connected to the emitter of an NPN transistor 27. The collector of transistor 27 is connected to a source of positive supply voltage ($V_{cc}$) The collector of transistor 25 is connected to bias arrangement the purpose of which is discussed below. The tuning voltage (TV) is coupled to the base of transistor 27 through a low pass filter 29. When a negative-going retrace pulse is present, transistors 25 and 27 are rendered conductive thereby causing a capacitor 31 to be charged. This causes a negative-going horizontal rate ramp voltage to be developed at a circuit point A. The DC level of the ramp voltage is determined by the magnitude of the tuning voltage.

The ramp voltage at circuit point A is coupled to a first input 33a of an AND gate 33 which serves as a comparator in the following manner. Assuming for the present that a second input 33b of AND gate 33 is provided with a high logic level, AND gate 33 is enabled to produce at its output at circuit point B a transition 103 to the high logic level when the ramp signal at point A rises above switching threshold 101 of AND gate 33 and to produce a transition 105 to the low logic level when the ramp signal falls below switching threshold 101 as indicated in waveforms A and B of FIG. 2. This produces a positive-going pulse at circuit point B.

The positive-going pulse produced at circuit point B is differentiated by a differentiator 35 comprising a capacitor 37 and the impedance appearing at a circuit point C corresponding to the input circuitry of a PNP switching transistor 39 including resistors 41, 43 and 45. The differentiated signal appearing at point C includes a positive-going pulse 107 and a negative-going pulse 109 as shown in waveform C of FIG. 2. The widths of the positive and negative-going pulse are determined by the time constant of differentiator 35.

Switching transistor 39 is rendered conductive in response to negative-going pulse 109 of the differentiated signal developed at circuit point C to develop a corresponding positive-going pulse 111 at its collector at a circuit point D as indicated in waveform D of FIG. 2. Positive-going pulse 111 produced at circuit point D is coupled through a current limiting resistor 47 to a first input 49a of an AND gate 49. A second input of AND gate 49 receives a display control signal from a display control unit 51. When the display control signal has the high logic level, AND gate 49 is enabled and the positive-going pulse generated at circuit point D causes a corresponding positive-going pulse 113 to be produced at the output of AND gate 49 at point E, as shown in waveform E. Positive-going pulse 113 generated at circuit point E is coupled to picture tube drivers 7 and causes a vertical bar 53 to be generated on screen 9a of picture tube 9 which has its horizontal position determined by the magnitude of the tuning voltage and its width determined by the time constant of differentiator 35. Channel numbers are formed in an area 55 below screen 9a by which a user can determine the channel being tuned from the horizontal position of the vertical bar.

The display control signal coupled to input 49b of AND gate 49 is caused to have the high logic level by display control unit 51 whenever signal seeking tuner control unit 15 is changing the magnitude of the tuning control signal, i.e., after one of the up or down push buttons 17 has been depressed, and for a predetermined time after an active channel has been located. The display control signal is also caused to have the high logic level by display control unit 51 for the predetermined time after a display recall pushbutton 52 is depressed.

Since tuner 3 is a multi-band tuner, it is desirable to indicate which band a tuned channel is in. For this purpose, the pulse generated at circuit point E is coupled through switching diodes 57 and 59 to the green and red drivers 7, respectively. Diodes 57 and 59 are selectively rendered conductive in response to the band selection signals when a channel in the VHF band or a channel in the UHF band has been tuned, respectively. This causes a red bar to be displayed when the channel is in the UHF band and a green bar to be displayed when the channel is in the VHF band.

The starting point of the bar on screen 9a from its left edge is determined for each band by means of a biasing network 61 including an adjustable biasing resistor for each of the bands coupled to the base of transistor 27. When a band is selected, the appropriate biasing resistor is selected and couples a portion of the corresponding band switching signal (a positive voltage) to the base of transistor 27. A biasing network 63 similar to biasing network 61 coupled to the base of an NPN transistor 65 controls the collector current of transistor 25 and thereby the discharge rate of capacitor 31. This determines the stopping point of the bar on screen 9a from its right edge for each band.

For the sake of economy, AND gates 33 and 49 are contained in the same integrated circuit as indicated by 67. The CD4081 integrated circuit manufactured by National Semiconductor Corporation of Santa Clara, California includes four two-input AND gates and is, therefore, suitable for use as integrated circuit 67. The two remaining AND gates may be employed in other portions of the tuning-channel indicator system.

As so far described, the system is an ideal one. However, the present inventor has found that since AND gates 33 and 49 are contained in the same integrated circuit, they interact in an unintended and undesirable manner. Specifically, it has been found that after the ramp signal at circuit point A has fallen below the switching threshold of first AND gate 33 and the output signal of first AND gate 33 at circuit point B undergoes negative-going transition 105 and positive-going pulse 113 is as a result produced at the output of second AND gate 49 at circuit point E, an unwanted second positive-going pulse 203, shown by the dashed line portion of the waveform B of FIG. 2, is generated at circuit point B due to the switching of second AND gate 49 and its unintended interaction with first AND gate 33. Second pulse 203 produced at circuit point B causes corresponding second pulses 205, 207 and 209 at circuit points C, D and E, respectively, as shown by the dashed line portions of waveforms C, D and E of FIG. 2. Positive-going pulse 209 produced at the output of AND gate 49 at circuit point E may produce a second vertical bar 69 to be produced on screen 9a of picture tube 9 which is disconcerting and may be confusing to a viewer.

The undesired interaction between AND gates 33 and 49 is thought to be produced by the coupling back of the desired first positive pulse 113 produced at the output of second AND gate 49 at circuit point E to first AND gate 33 in a manner so as to, in effect, temporarily raise the amplitude of the ramp signal appearing at point A relative to switching threshold 101 of first AND gate 33 thereby causing undesired second pulses 203, 205, 207 and 209 to be generated. A similar result may occur due to the power supply loading of integrated circuit 67 when both AND gates 33 and AND gate 49 and transistor 39 switch. While this can be solved by adequate filtering by means of a power supply filter capacitor 71, the aforementioned undesirable feedback coupling between second AND gate 49 and first AND gate 33 can not be so overcome.

To prevent the generation of the undesired second pulses due to the feedback coupling between second AND gate 49 and first AND gate 33, as well as to prevent the generation of the undesired second pulses due to any power supply loading, the output of differentiator 35 is coupled back to second input 33b of AND gate 33 through a feedback resistor 73. Normally, a positive DC voltage developed at circuit point C, due to the coupling of resistor 41 between the source of positive supply voltage ($V_{cc}$) and circuit point C, is coupled to second input 33b and enables AND gate 33 to respond as a comparator to the ramp signal developed at circuit point A. However, after the amplitude of the ramp signal at circuit point A falls below switching threshold 101 of AND gate 33 and negative-going transition 105 occurs at the output of AND gate 33 at circuit point B, negative-going pulse 109, generated at the output of differentiator 35 at circuit point C in response to negative-going transition 105, is coupled through feedback resistor 73 to second input 33b of AND gate 33. This temporarily inhibits AND gate 33 from switching for a short time after negative-going transition 105 of the positive-going pulse developed at circuit point B. The time duration for which AND gate 33 is inhibited is determined by the value of resistor 73 in conjunction with the time constant determining elements of differentiator 35 and is selected so that AND gate 33 is disabled long enough to prevent it from generating unwanted second pulse 203 after transition 105.

Typical values for certain elements of the embodiment shown in FIG. 1 germane to the preferred embodiment of the present invention are listed below.

| capacitor 37 | 39 picofarads |
| resistor 41 | 5600 ohms |
| resistor 43 | 4700 ohms |
| resistor 45 | 2200 ohms |
| supply voltage $V_{cc}$ | 10 volts |

While the present invention has been described in terms of a preferred embodiment, it will be appreciated that modifications to the preferred embodiment may be used. For example, for the purpose of reducing radio frequency interference, it has been found desirable to couple a capacitor 75, e.g., with a capacitance of 100 picofarads for the values indicated in the above table, with the output of AND gate 33. Further, while the invention has been described with respect to an arrangement which includes AND gates, it is also applicable to arrangements which employ other types of AND function gates such as NAND gates. In addition, while the invention has been described with respect to a channel indicator system which uses a horizontal deflection rate signal to develop a vertical tuning bar, it can also be applied to a channel indicator system which uses a vertical deflection rate signal to develop a horizontal tuning bar. These and other modifications are intended to be within the scope of the present invention defined by the following claims.

What is claimed is:

1. In a television receiver including tuner means controlled in response to a tuning signal generated by a tuning control unit for tuning RF signals corresponding to respective channels; signal processing means coupled to said tuner means for generating a picture representative baseband signal including picture synchronization components; deflection means responsive to said synchronization component for generating horizontal and vertical rate deflection signals; and an image producing device responsive to said picture representative signal and said horizontal and vertical rate deflection signals for producing an image; and an on-screen channel indicator apparatus, said on-screen channel indicator apparatus comprising:

a ramp signal generator coupled to said deflection unit and to said tuning control means to generate a composite ramp signal including a ramp component varying at one of said deflection rates and a level component determined by said tuning signal;

first and second logic gates, each having at least one input and an output, included in a single integrated circuit;

said composite ramp signal being coupled to said input of said first logic gate, said first logic gate generating a first transition at its said output when the amplitude of said composite ramp signal traverses a predetermined switching threshold in a predetermined sense;

pulse generating means having an input coupled to said output of said first logic gate and an output coupled to said input of said second logic gate for generating at said output of said second logic gate a pulse having a predetermined time duration in response to said first transition;

coupling means for coupling said output of said second logic gate to said image reproducing device; and feedback means coupled between said output of said pulse generating means and said first logic gate and cooperating with said pulse generating means for inhibiting said first logic gate from generating a second transition at its said output for a predetermined time after the generation of said first transition.

2. The apparatus recited in claim 1, wherein:
said pulse generating means includes a differentiator.

3. 9. The apparatus recited in claim 2, wherein:
said first logic gate is an AND function gate having first and second inputs;
said composite ramp signal is coupled to said first input of said first logic gate; and
said feedback means is coupled between said output of said differentiator and said second input of said first logic gate.

4. The apparatus recited in claim 3, wherein:
said feedback means is DC coupled between said output of said differentiator and said second input of said first logic gate and includes bias means for normally enabling said first logic gate to respond to said composite ramp signal.

5. The apparatus recited in claim 4, wherein:
said feedback means includes a resistor coupled between said output of said differentiator and said second input of said first logic gate.

6. The apparatus recited in claim 5, wherein:
said second logic gate is also an AND function gate having first and second inputs, said first input being coupled to said output of said differentiator; and
said channel indicator apparatus further includes display enabling means coupled to said second input of said second logic gate for enabling said second logic element to respond to the signal produced at the output of said differentiator.

* * * * *